(12) United States Patent
Ochiai et al.

(10) Patent No.: US 7,355,826 B2
(45) Date of Patent: Apr. 8, 2008

(54) POWER SUPPLY APPARATUS CAPABLE OF DETECTING ABNORMALITY OF CURRENT FLOWING THROUGH DRIVE CIRCUIT

(75) Inventors: Kiyoe Ochiai, Nagoya (JP); Hideaki Yaguchi, Toyota (JP); Tatsuyuki Uechi, Toyoake (JP); Koji Yagi, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 257 days.

(21) Appl. No.: 11/148,345

(22) Filed: Jun. 9, 2005

(65) Prior Publication Data
US 2006/0007615 A1    Jan. 12, 2006

(30) Foreign Application Priority Data
Jul. 7, 2004   (JP)   ............................ 2004-200714
Mar. 18, 2005  (JP)   ............................ 2005-079831

(51) Int. Cl.
    *H02H 7/08*   (2006.01)
(52) U.S. Cl. .............................. 361/23; 361/24; 361/31
(58) Field of Classification Search ................. 318/434; 361/23, 24, 28, 31; 363/41, 97
See application file for complete search history.

(56) References Cited

U.S. PATENT DOCUMENTS

| | | | | |
|---|---|---|---|---|
| 4,286,303 A | * | 8/1981 | Genheimer et al. | 361/24 |
| 4,504,881 A | * | 3/1985 | Wada et al. | 361/23 |
| 4,527,214 A | * | 7/1985 | Hattori et al. | 361/96 |
| 4,862,343 A | * | 8/1989 | Nomura et al. | 363/41 |
| 5,068,777 A | * | 11/1991 | Ito | 363/97 |
| 5,353,188 A | * | 10/1994 | Hatakeyama | 361/97 |
| 5,461,531 A | * | 10/1995 | Tuchiya et al. | 361/28 |
| 5,994,790 A | * | 11/1999 | Nagashima et al. | 307/10.1 |
| 6,324,038 B1 | * | 11/2001 | Kishibe et al. | 361/31 |
| 7,245,094 B2 | * | 7/2007 | Shinmura et al. | 318/139 |
| 7,262,574 B2 | * | 8/2007 | Koyanagi et al. | 318/568.16 |
| 2005/0286181 A1 | * | 12/2005 | Ochiai | 361/23 |
| 2007/0046226 A1 | * | 3/2007 | Takahashi | 318/268 |
| 2007/0097566 A1 | * | 5/2007 | Woods et al. | 361/33 |

FOREIGN PATENT DOCUMENTS

| | | |
|---|---|---|
| JP | A 7-123504 | 5/1995 |
| JP | A 2004-215316 | 7/2004 |

* cited by examiner

*Primary Examiner*—Lincoln Donovan
*Assistant Examiner*—Michael Brandt
(74) *Attorney, Agent, or Firm*—Oliff & Berridge, PLC

(57) ABSTRACT

A current detection unit starts sampling of a motor current at the timing when the motor current has exceeded a threshold value, and holds a maximum motor current value for each prescribed operation cycle. An abnormality determination unit determines whether the maximum motor current value is greater than the threshold value, and counts the number of times that the maximum motor current value continuously exceeds the threshold value. When the count value has reached at least 3, the abnormality determination unit generates and outputs a detection signal indicating abnormality in the motor current to a relay drive unit and a notification unit. The relay drive unit in receipt of the detection signal generates a signal to turn off the system relays. The notification unit generates and outputs a signal AL to display means outside the power supply apparatus.

37 Claims, 11 Drawing Sheets

POWER SUPPLY APPARATUS CAPABLE OF DETECTING ABNORMALITY OF CURRENT FLOWING THROUGH DRIVE CIRCUIT

This nonprovisional application is based on Japanese Patent Applications Nos. 2004-200714 and 2005-079831 filed with the Japan Patent Office on Jul. 7, 2004 and Mar. 18, 2005, respectively, the entire contents of which are hereby incorporated by reference.

BACKGROUND OF THE INVENTION

1. Field of the Invention

The present invention relates to a power supply apparatus, and more particularly to a power supply apparatus having a function to detect abnormality of a current flowing through a drive circuit incorporated in the power supply apparatus.

2. Description of the Background Art

Hybrid vehicles and electric vehicles have been attracting attention as they help the environment. The hybrid vehicle includes, as its power source, a direct current (DC) power supply, an inverter and a motor driven by the inverter, in addition to a conventional engine. Specifically, the engine is driven to generate power while a DC voltage from the DC power supply is converted into an alternating current (AC) voltage by the inverter to rotate the motor by the AC voltage and accordingly generate power.

The power source of the electric vehicle is a DC power supply, an inverter and a motor driven by the inverter.

A DC power supply being incorporated in the hybrid or electric vehicle is usually of high voltage so as to obtain high output. When a DC power supply of such a high voltage is used, however, the electric motor may seize up or burn out due to overheat at the time of overload. There may also be a risk of receiving an electric shock at the time of electric leakage. Thus, a safety device for preventing such risks is demanded (see, e.g., Japanese Patent Laying-Open Nos. 07-123504 and 2004-215316).

FIG. 13 is a block diagram showing a configuration of a safety device for an electric vehicle described in Japanese Patent Laying-Open No. 07-123504.

Referring to FIG. 13, the electric vehicle safety device 200 includes a switch 150 provided at a feeder line L from a DC power supply 110 to a load circuit 130. Switch 150 is configured to open/close in accordance with an external signal supplied from a protective circuit 140 to a drive circuit 151.

More specifically, in protective circuit 140, a current detector 141 detects a current flowing through feeder line L. An output of current detector 141 is amplified by a current detection circuit 142 and input to a control circuit 143. When a current value detected after a lapse of a prescribed operation time from the time point when the detected current value exceeded a rated current of load circuit 130 is still greater than the rated current, control circuit 143 drives an output relay circuit 144 so as to turn off a contact point r of switch 150 via drive circuit 151.

Clocking of the operation time is started at the time point when the current value detected by current detector 141 exceeded the rated current, and the operation time is set such that switch 150 is shut off when the current does not become equal to or lower than the rated current even after a lapse of the operation time. The operation time is set in accordance with the magnitude of the passing current, for example to be shorter inversely proportional to the increase of the current value. If the detected current becomes equal to or lower than the rated current within the operation time, switch 150 is not shut off, and clocking of the operation time will be started again when the detected current exceeds the rated current next time.

In the safety device for an electric vehicle shown in FIG. 13, following detection of a passing current exceeding the rated current, if the current does not become smaller than the rated current after a prescribed operation time from the detection, feeding to load circuit 130 is shut off, ensuring protection against overcurrent.

Further, feeding to load circuit 130 continues until the operation time elapses. That is, feeding to load circuit 130 is not immediately shut off even if load circuit 130 becomes temporarily overload. This avoids the undesirable situation where protective circuit 140 is activated to shut off the feeding when there is no abnormality.

In the abnormality determination method in FIG. 13, however, presence/absence of abnormality in the passing current is determined based on the rated current and the operation time that is decided uniquely in accordance with the magnitude of the passing current. This poses a problem in accuracy of abnormality detection in the following points.

Specifically, in the case where load circuit 130 of FIG. 13 includes an inverter and an AC motor, the passing current shows a current waveform of sine wave in a normal operation, whereas it shows a current waveform quite different from the original sine wave when there is abnormality in control of the inverter.

For example, the passing current at the time of abnormality may have a current waveform pattern that temporarily becomes considerably greater than the rated current, or a current waveform pattern that continuously flows in the vicinity of the upper limit of sine wave, going above and below the limit. When a large current exceeding the rated current flows through the inverter, the inverter will suffer temporarily a great load in accordance with the magnitude of the passing current and the time period during which it flows, possibly leading to breaking of the inverter. Meanwhile, when the current continuously flows in the vicinity of the upper limit of sine wave, the inverter will continuously suffer the load of the maximum level in the normal operation, which may also break the inverter. As such, in order to prevent breaking of the inverter, the current waveform that cannot be observed in a normal operation should be reliably determined to be abnormal.

Thus, in the above-described abnormality detection method, the abnormal current temporarily exceeding the rated current considerably is determined to be abnormal if the time period during which it flows exceeds a prescribed operation time.

Meanwhile, in order to detect the abnormal current continuously flowing in the vicinity of the upper limit of sine wave, the threshold value as the criterion for determination of abnormality needs to be set as low as the upper limit of sine wave, instead of the rated current. If the threshold value is set to the upper limit of sine wave, however, it is difficult to detect the abnormal current flowing in the vicinity of the upper limit of sine wave with accuracy, since when the passing current becomes lower than the threshold value within the time limit of the operation time, the clocking operation is reset and restarted when the passing current exceeds the threshold value again. That is, if the operation time is set relatively short, the passing current that temporarily exceeds the upper limit of sine wave, which is only a small load to the inverter, may be determined abnormal, whereas the passing current continuously flowing in the vicinity of the upper limit of sine wave may not be determined abnormal because of the reset of the clocking operation. As such, according to the abnormality determination method described above, the pattern of the abnormal current undesirable for the inverter and the result of determination of abnormality are not always consistent with each other.

SUMMARY OF THE INVENTION

An object of the present invention is to provide a power supply apparatus capable of detecting abnormality of a current flowing through a drive circuit driving a load with high accuracy.

According to an aspect of the present invention, a power supply apparatus includes: a power supply; a drive circuit for receiving supply of power from the power supply and driving a load circuit; and an abnormal current detection circuit for detecting abnormality in a drive current flowing through the drive circuit. The abnormal current detection circuit includes a current detection unit for detecting a maximum value of the drive current for each prescribed operation cycle, and an abnormality determination unit for determining whether the maximum value of the drive current exceeds a prescribed threshold value for each prescribed operation cycle and determining presence of abnormality in the drive current when detecting that the maximum value of the drive current exceeds the prescribed threshold value in each of n (n is a natural number of at least 3) consecutive cycles of the prescribed operation cycles.

According to another aspect of the present invention, a power supply apparatus includes: a power supply; a drive circuit for receiving supply of power from the power supply and driving a load circuit; and an abnormal current detection circuit for detecting abnormality in a drive current flowing through the drive circuit. The abnormal current detection circuit includes a current detection unit for starting sampling of the drive current using a prescribed threshold value as a trigger and detecting a maximum value of the drive current for each prescribed operation cycle, and an abnormality determination unit for determining whether the maximum value of the drive current exceeds the prescribed threshold value for each prescribed operation cycle, and determining presence of abnormality in the drive current when detecting that the maximum value of the drive current exceeds the prescribed threshold value in each of n (n is a natural number of at least 3) consecutive cycles of the prescribed operation cycles.

Preferably, the load circuit includes an AC motor, and the abnormal current detection circuit further includes a mode determination unit for determining a control mode of the AC motor. The abnormality determination unit adjusts the prescribed threshold value to a threshold value suitable for the determined control mode, determines whether the detected maximum value of the drive current exceeds the suitable threshold value for each prescribed operation cycle, and determines presence of abnormality in the drive current when detecting that the maximum value of the drive current exceeds the suitable threshold value in each of the n consecutive prescribed operation cycles.

Preferably, the mode determination unit determines one of control modes having different carrier frequencies. Preferably, the abnormality determination unit adjusts the threshold value in accordance with the carrier frequency of the determined control mode.

Preferably, the power supply apparatus further includes a rotation number detection unit for detecting a motor rotation number of the AC motor based on a rotation angle of the AC motor. The abnormality determination unit determines whether the maximum value of the drive current exceeds the prescribed threshold value for each prescribed operation cycle and whether the motor rotation number is not greater than a prescribed rotation number, and determines presence of abnormality in the drive current when detecting that the maximum value of the drive current exceeds the prescribed threshold value in each of the n consecutive prescribed operation cycles and that the motor rotation number is not greater than the prescribed rotation number.

Preferably, the prescribed rotation number is set smaller than a motor rotation number detected by the rotation number detection unit during a normal operation of the power supply apparatus.

Preferably, the power supply apparatus further includes a switch for electrically connecting/disconnecting the power supply to/from the drive circuit by an opening/closing operation. The abnormal current detection circuit controls the opening/closing operation in such a manner that the power supply is electrically disconnected from the drive circuit upon detection of abnormality in the drive current.

Preferably, the prescribed threshold value is set to a current level higher than the drive current flowing in the drive circuit when the power supply apparatus is in a normal operation.

Preferably, a period corresponding to a total sum of the n consecutive prescribed operation cycles is set shorter than a time period causing breaking of the drive circuit when the drive current of a current level corresponding to the prescribed threshold value continuously flows in the drive circuit during the time period.

Preferably, the "n" is set to 3.

Preferably, the abnormality determination unit includes a counting unit. The counting unit increments a count value when it is determined that the maximum value of the drive current exceeds the prescribed threshold value and resets the count value when it is determined that the maximum value of the drive current does not exceed the prescribed threshold value in each prescribed operation cycle. The abnormality determination unit determines presence of abnormality in the drive current when detecting that the count value has reached a count value equal to the "n".

Preferably, the abnormality determination unit adjusts the "n" in accordance with the prescribed threshold value.

Preferably, the abnormality determination unit adjusts the "n" to a smaller value as the prescribed threshold value becomes higher.

Preferably, the abnormal current detection circuit further includes a temperature detection unit for detecting a temperature of a circuit element of the drive circuit. The abnormality determination unit adjusts the "n" in accordance with the detected temperature of the circuit element.

Preferably, the abnormality determination unit adjusts the "n" to a smaller value as the detected temperature of the circuit element becomes higher.

Preferably, the prescribed operation cycle is longer than a shortest operation cycle of the abnormal current detection circuit.

Preferably, the current detection unit samples a drive current in the shortest operation cycle, and extracts and holds a maximum value of the drive current from among the sampled drive currents for each prescribed operation cycle.

According to the present invention, presence of abnormality is determined when detecting that the drive current exceeds a prescribed threshold value in at least three consecutive prescribed operation cycles. Thus, compared to the conventional abnormality determination method where presence of abnormality is determined based on the appearance of the passing current in a single operation time, it is possible to detect the abnormality in the drive current with higher accuracy.

Further, since the threshold value of the drive current is adjusted in accordance with the control mode of the AC motor, presence of abnormality can be determined with high accuracy irrespective of the waveform of the abnormal current, thus ensuring protection of the drive circuit.

According to the present invention, presence of abnormality is determined when detecting that the drive current exceeds the prescribed threshold value in at least three consecutive prescribed operation cycles and that the motor rotation number is not greater than a prescribed threshold value. In this case, accuracy in determination of abnormality is further improved, and thus, erroneous detection of the abnormality in the drive current can be avoided.

Still further, since the prescribed threshold value for determination of abnormality in the drive current is correlated with the prescribed period, the load imposed on the drive circuit upon occurrence of abnormality can be reduced, while maintaining the accuracy in detection.

Furthermore, according to the present invention, the drive current is detected in the shortest operation cycle of the CPU, and the abnormality determination is carried out in an operation cycle longer than the shortest operation cycle. This ensures effective use of the processing time of the CPU, and accordingly, it is possible to establish a highly accurate abnormality determination system with an inexpensive CPU.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
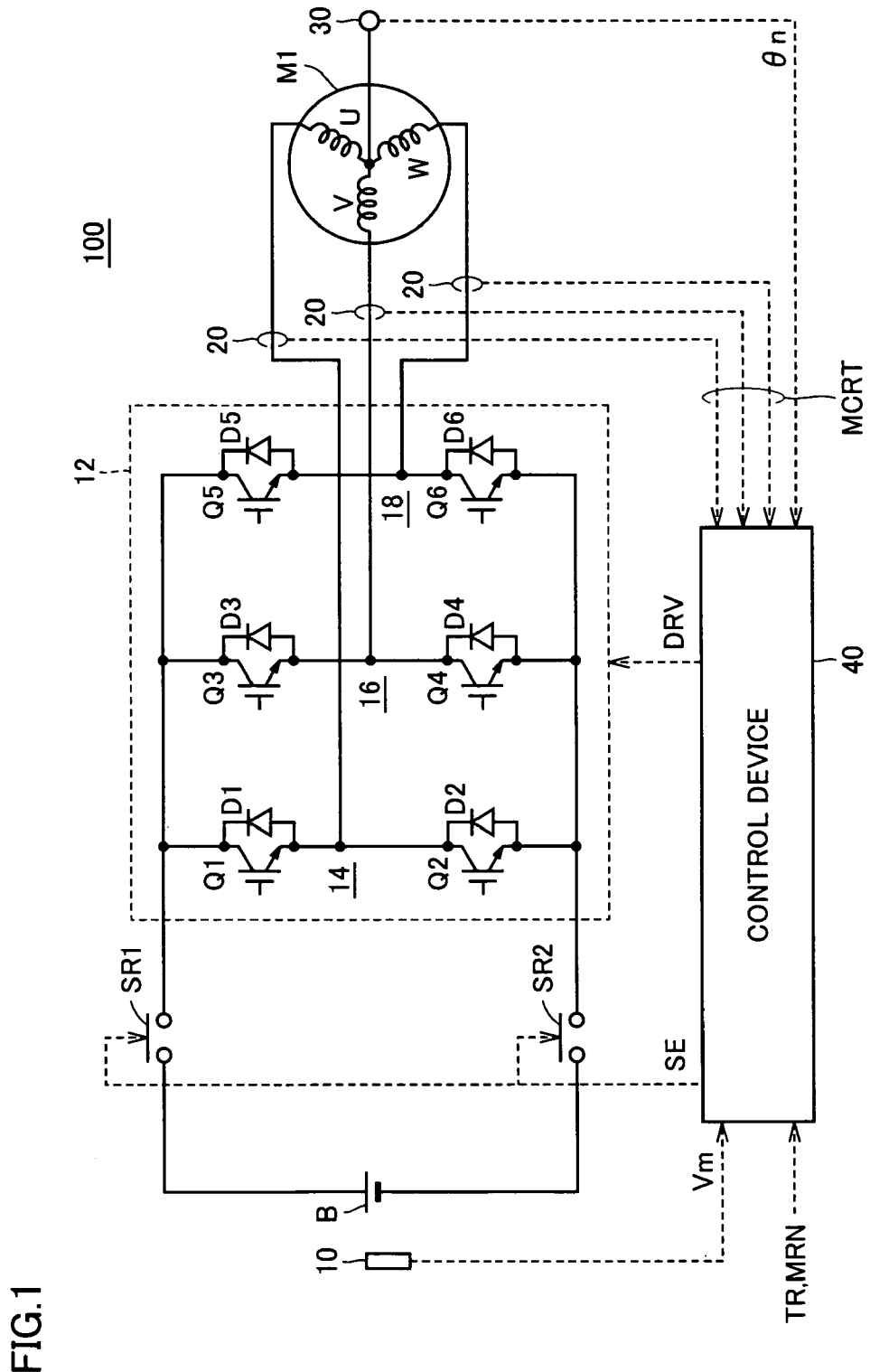
FIG. 1 is a schematic block diagram of a power supply apparatus according to a first embodiment of the present invention.

Hereinafter, embodiments of the present invention will be described in detail with reference to the drawings. In the drawings, the same or corresponding portions have the same reference characters allotted.

First Embodiment

FIG. 1 schematically shows a power supply apparatus according to a first embodiment of the present invention.

Referring to FIG. 1, the power supply apparatus 100 includes a DC power supply B, a voltage sensor 10, system relays SR1 and SR2, an inverter 12, a current sensor 20, a resolver 30, and a control device 40.

An AC motor M1 is a drive motor that generates torque for driving drive wheels of a hybrid or electric vehicle. It is a motor that can function as an electric power generator driven by the engine and also function as an electric motor for the engine to start the engine for example.

Inverter 12 is constituted of a U-phase arm 14, a V-phase arm 16, and a W-phase arm 18, which are arranged in parallel between a power supply line and a ground line.

U-phase arm 14 is formed of NPN transistors Q1, Q2 connected in series, V-phase arm 16 is formed of NPN transistors Q3, Q4 connected in series, and W-phase arm 18 is formed of NPN transistors Q5, Q6 connected in series. Diodes D1-D6 are each connected between the collector and emitter of corresponding one of NPN transistors Q1-Q6 for allowing a current to flow from the emitter to the collector.

The U, V and W-phase arms have respective intermediate points connected to respective ends of phase coils of AC motor M1. More specifically, AC Motor M1 is a three-phase permanent-magnet motor with three coils of U, V and W phases each having one end connected commonly to the center. The other end of the U-phase coil is connected to the intermediate point between NPN transistors Q1 and Q2, the other end of the V-phase coil is connected to the intermediate point between NPN transistors Q3 and Q4, and the other end of the W-phase coil is connected to the intermediate point between NPN transistors Q5 and Q6.

DC power supply B is formed of a nickel-hydrogen or lithium-ion secondary battery, although it may be a fuel battery. Voltage sensor 10 detects a voltage Vm output from DC power supply B, and outputs the detected voltage Vm to control device 40.

System relays SRI and SR2 are turned on/off by a signal SE from control device 40.

Inverter 12 receives a DC voltage from DC power supply B, and, according to a drive signal DRV from control device 40, converts the DC voltage into an AC voltage for driving AC motor M1. Then, AC motor M1 is driven to generate torque that is designated by a torque command value TR.

In regenerative braking of a hybrid or electric vehicle to which power supply apparatus 100 is incorporated, inverter 12 converts an AC voltage generated by AC motor M1 into a DC voltage according to a signal DRV from control device 40 and supplies the resultant DC voltage to DC power supply B.

Here, "regenerative braking" includes braking which is caused when a driver of a hybrid or electric vehicle manages the foot brake and which is accompanied by regenerative power generation, as well as deceleration (or stopping of acceleration) of the vehicle by releasing the accelerator pedal in driving without managing the foot brake, which is also accompanied by regenerative power generation.

Current sensor 20 detects a motor current MCRT flowing to AC motor M1, and outputs the detected motor current MCRT to control device 40.

Resolver 30 is attached to a rotating shaft of AC motor M1. It detects a rotation angle θn of a rotor of AC motor M1, and outputs the detected angle to control device 40.

Control device 40 receives torque command value TR and motor rotation number MRN from an externally provided electrical control unit (ECU), voltage Vm from voltage sensor 10, motor current MCRT from current sensor 20, and rotation angle θn from resolver 30.

Control device 40 uses rotation angle θn, torque command value TR and motor current MCRT received, to generate a drive signal DRV for driving NPN transistors Q1-Q6 of inverter 12, and outputs the generated drive signal DRV to inverter 12.

Further, in regenerative braking of the hybrid or electric vehicle to which power supply apparatus 100 is incorporated, control device 40 generates a drive signal DRV for converting the AC voltage generated by AC motor M1 to a DC voltage, based on rotation angle θn, torque command value TR and motor current MCRT, and outputs the generated drive signal DRV to inverter 12. Drive signal DRV controls switching of NPN transistors Q1-Q6 of inverter 12. Inverter 12 thus converts the AC voltage generated by AC motor M1 to a DC voltage and supplies the DC voltage to DC power supply B.

Figure 2:
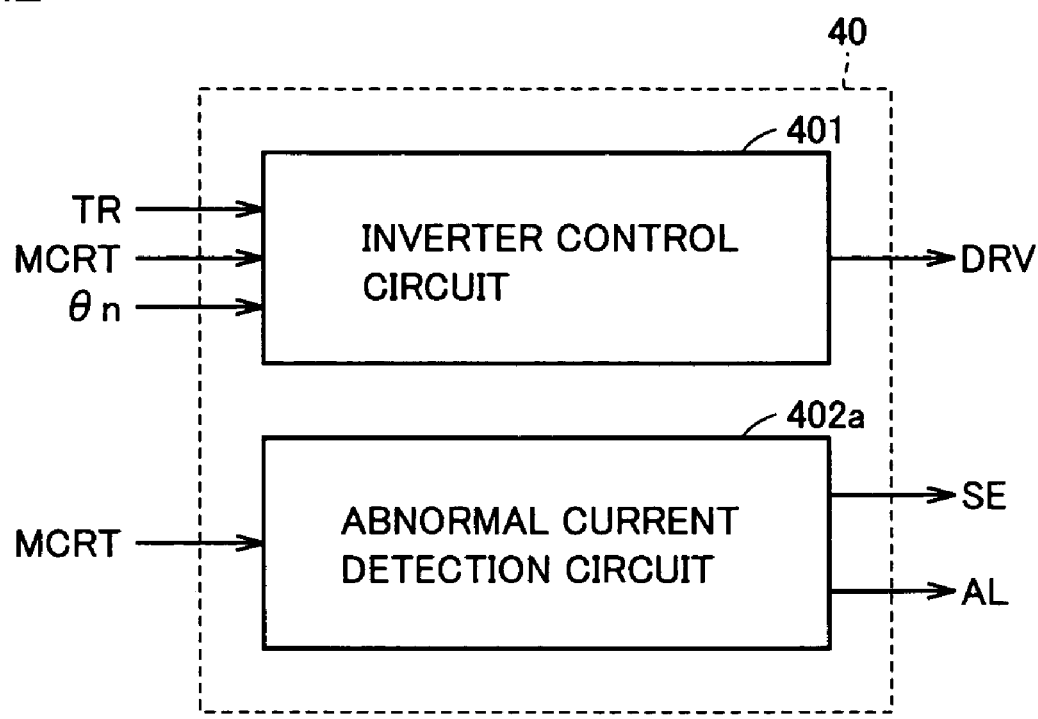
FIG. 2 is a block diagram of a control device shown in FIG. 1.

FIG. 2 is a block diagram of control device 40 in FIG. 1.

Referring to FIG. 2, control device 40 includes an inverter control circuit 401 and an abnormal current detection circuit 402a.

When AC motor M1 is in operation, inverter control circuit 401 generates drive signal DRV for turning on/off NPN transistors Q1-Q6 of inverter 12 based on rotation angle θn, torque command value TR and motor current MCRT, and outputs the generated drive signal DRV to inverter 12.

In regenerative braking of the hybrid or electric vehicle to which power supply apparatus 100 is incorporated, inverter control circuit 401 generates drive signal DRV for converting the AC voltage generated by AC motor M1 to a DC voltage based on rotation angle θn, torque command value TR and motor current MCRT, and outputs the generated drive signal DRV to inverter 12.

Abnormal current detection circuit 402a samples motor current MCRT detected by current sensor 20, and detects occurrence of abnormality in motor current MCRT based on the sampled current level. Upon detection of abnormality in motor current MCRT, abnormal current detection circuit 402a generates a signal SE for turning off system relays SR1, SR2, and outputs the generated signal SE to system relays SR1, SR2. Abnormal current detection circuit 402a also generates a signal AL for informing a user of the occurrence of abnormality, and outputs the generated signal AL to the outside of power supply apparatus 100.

Figure 3:
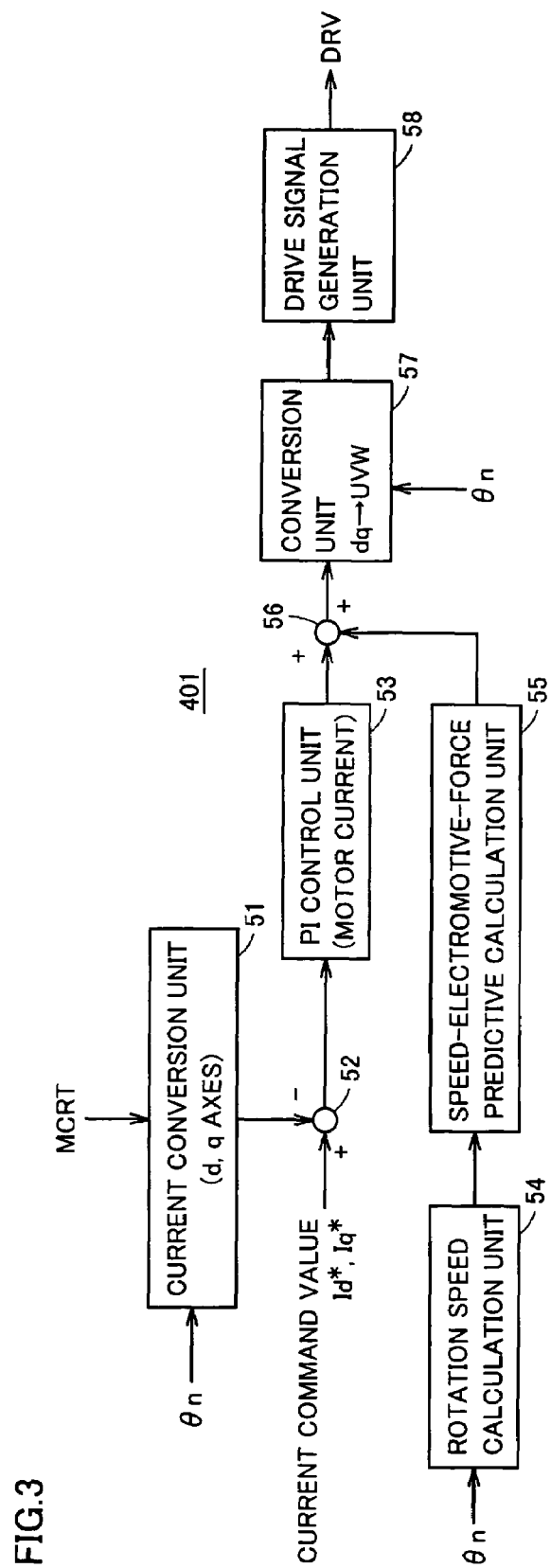
FIG. 3 is a control block diagram of an inverter control circuit shown in FIG. 2.

FIG. 3 is a control block diagram of inverter control circuit 401 in FIG. 2.

Referring to FIG. 3, inverter control circuit 401 includes a current conversion unit 51, a subtracter 52, a PI control unit 53, a rotation speed calculation unit 54, a motional electromotive force prediction calculation unit 55, an adder 56, a conversion unit 57, and a drive signal generation unit 58.

Current conversion unit 51 carries out 3-phase to 2-phase conversion on motor current MCRT detected by current sensor 20, using rotation angle θn output from resolver 30. Specifically, current conversion unit 51 uses rotation angle θn to convert the 3-phase motor current MCRT flowing through the respective phases of AC motor M1 into current values Id and Iq flowing through the d axis and q axis, respectively, and outputs the resultant current values Id, Iq to subtracter 52.

Subtracter 52 subtracts current values Id, Iq received from current conversion unit 51 from current command values Id*, Iq* for causing AC motor M1 to output torque designated by torque command value TR, to thereby obtain deviation values ΔId, ΔIq.

PI control unit 53 uses PI gain to calculate an adjustment amount of the motor current with respect to deviation values ΔId, ΔIq.

Rotation speed calculation unit 54 calculates the rotation speed of AC motor M1 based on rotation angle θn received from resolver 30, and outputs the calculated rotation speed to motional electromotive force prediction calculation unit 55. Motional electromotive force prediction calculation unit 55 calculates a predicted value of the motional electromotive force based on the rotation speed received from rotation speed calculation unit 54.

Adder 56 adds the predicted value of the motional electromotive force received from speed-electromotive-force predictive unit 55 to the adjustment amount of the motor current received from PI control unit 53, to thereby obtain voltage adjustment amounts Vd and Vq to be applied to the d axis and the q axis, respectively.

Conversion unit 57 converts voltage adjustment amounts Vd, Vq to be applied to the d and q axes into voltage adjustment amounts to be applied to the 3-phase coils of AC motor M1 using rotation angle θn. Drive signal generation unit 58 generates a drive signal DRV based on the outputs from conversion unit 57.

Figure 4:
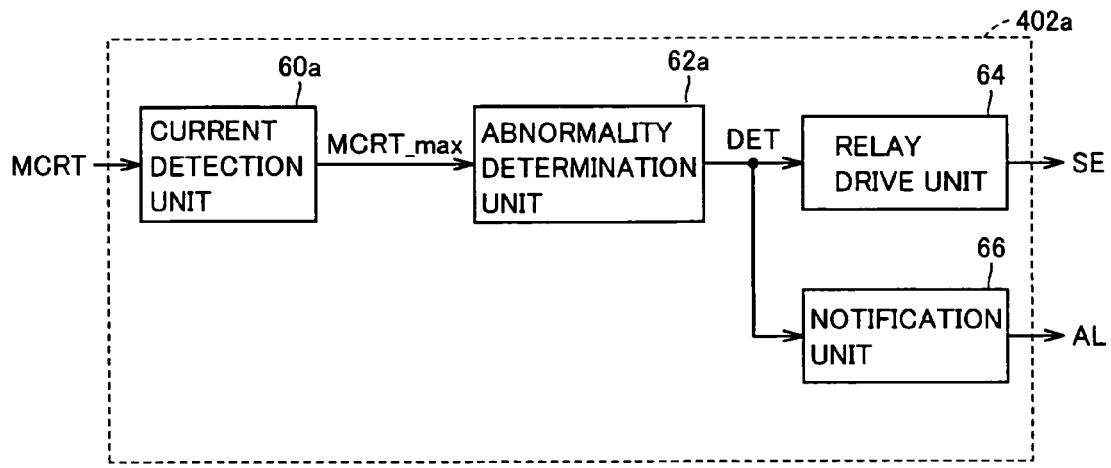
FIG. 4 is a block diagram of an abnormal current detection circuit shown in FIG. 2.

FIG. 4 is a block diagram of abnormal current detection circuit 402a shown in FIG. 2.

Referring to FIG. 4, abnormal current detection circuit 402a includes a current detection unit 60a, an abnormality determination unit 62a, a relay drive unit 64, and a notification unit 66.

Current detection unit 60a receives motor current MCRT detected by current sensor 20. Current detection unit 60a prestores a prescribed threshold value MCRT_std as a reference current value for determination of abnormality. When motor current MCRT exceeds this threshold value MCRT_std, current detection unit 60a starts sampling of motor current MCRT in a prescribed operation cycle (hereinafter, also referred to as "first operation cycle"). Here, the first operation cycle can be set to an arbitrary period by a user, although it is preferably set to a shortest operation cycle of the central processing unit (CPU) implementing control device 40, in consideration of accuracy in detection of abnormality.

Further, current detection unit 60a captures and holds a maximum value of motor current MCRT (hereinafter, also referred to as "maximum motor current value MCRT_max") from among the sampled motor currents MCRT, for each prescribed operation cycle longer than the first operation cycle (hereinafter, also referred to as "second operation cycle").

Here, the second operation cycle corresponds to an operation cycle of abnormality determination processing as will be described later, which can also be set to an arbitrary period by the user, as in the case of the first operation cycle. However, in order to suppress the load of the CPU required for the abnormality determination to the greatest possible extent, the second operation cycle is preferably set longer than the shortest operation cycle of the CPU. In the present embodiment, the second operation cycle is set to 10 ms, for example.

Maximum motor current value MCRT_max held for each second operation cycle is output to abnormality determination unit 62a. Upon receipt of maximum motor current value MCRT_max, abnormality determination unit 62a determines presence/absence of abnormality in motor current MCRT based on the relation in magnitude of maximum motor current value MCRT_max to threshold value MCRT_std serving as the criterion for abnormality detection, as will be explained in the following.

Figure 5:
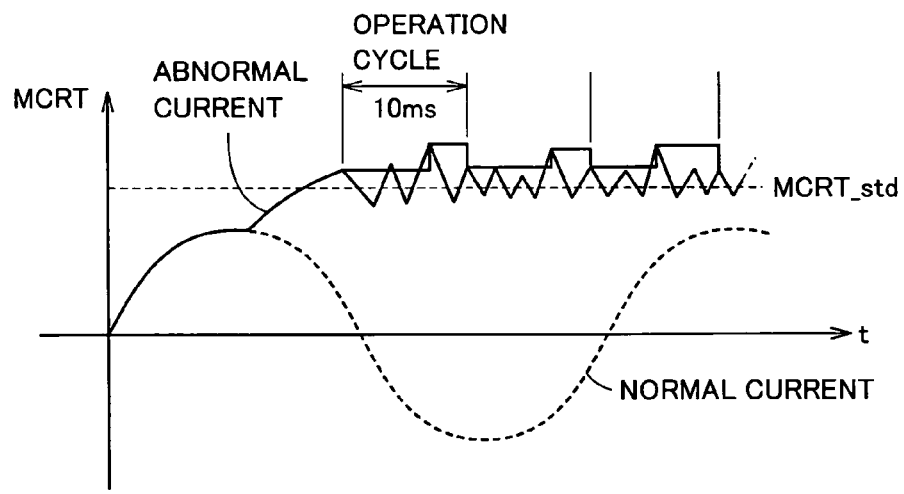
FIG. 5 is a schematic diagram illustrating an abnormality detecting operation in the abnormal current detection circuit shown in FIG. 4.

FIG. 5 schematically illustrates an abnormality detecting operation of abnormal current detection circuit 402a shown in FIG. 4.

Referring to FIG. 5, motor current MCRT takes a current waveform of sine wave, as shown by a dotted line, when power supply apparatus 100 is in a normal state. If abnormality such as breaking of resolver 30 occurs in power supply apparatus 100, motor current MCRT takes a current waveform as shown by a solid line that oscillates from the sine wave. In such a case, if it continues oscillation at a current level higher than the normal current level, as shown in FIG. 5, overcurrent will continuously flow through inverter 12, which may break inverter 12.

Therefore, in the present embodiment, abnormal current detection circuit 402a prestores threshold value MCRT_std of motor current MCRT serving as the criterion for abnormality detection, and is configured to determine occurrence of abnormality in power supply apparatus 100 when detecting continuous flow of motor current MCRT exceeding this threshold value MCRT_std.

Specifically, when maximum motor current value MCRT_max held in current detection unit 60a for each second operation cycle (=10 ms) is sent to abnormality determination unit 62a, it is compared in magnitude with threshold value MCRT_std. Abnormality determination unit 62a has a counter circuit therein, and if it is determined that maximum motor current value MCRT_max is greater than threshold value MCRT_std, it increments count value CNT (CNT=CNT+1). Meanwhile, if it is determined that maximum motor current value MCRT_max input is smaller than threshold value MCRT_std, it resets count value CNT (CNT=0).

In this manner, abnormality determination unit 62a compares maximum motor current values MCRT_max, input continuously in the second operation cycles, with threshold value MCRT_std at every second operation cycle, and increments or resets count value CNT in accordance with the results of comparison.

Further, abnormality determination unit 62a detects abnormality of motor current MCRT at the timing when count value CNT exceeds a reference count value CNT_std (for example, CNT_std=3) that is preset as the criterion for determination of abnormality. Specifically, when abnormality determination unit 62a detects that motor current MCRT has exceeded threshold value MCRT_std in three consecutive second operation cycles (=3×10 ms), it determines that motor current MCRT is abnormal.

With this configuration, abnormality of motor current MCRT is detected when abnormality appears in at least three consecutive second operation cycles, with the second operation cycle being a unit of abnormality determination. This means that abnormality is not detected when only a small load is imposed on inverter 12 in such a case that motor current MCRT shows instantaneously a high current value. Furthermore, it is possible to reliably detect the abnormal current that oscillates in the vicinity of the upper limit level of sine wave, which would have been difficult to detect in a conventional abnormality detection method, so that accuracy in abnormality detection is improved.

Reference count value CNT_std set in abnormality determination unit 62a, CNT_std=3 in the present embodiment, needs to be "a natural number of at least 3". Further, the abnormality determination period, corresponding to the product of the set reference count value CNT_std and the second operation cycle, is required to be within the time period during which inverter 12 will not be broken.

Here, reference count value CNT_std is restricted to the "natural number of at least 3" so as to avoid erroneous abnormality detection. More specifically, assume the case where a single maximum motor current value MCRT_max is located on the boundary between two consecutive second operation cycles and where this maximum motor current value MCRT_max is greater than threshold value MCRT_std. In such a case, count value CNT will be incremented by 1 each in these two operation cycles, and as a result, count value CNT will be incremented by 2 in all. If reference count value CNT_std is set to "2", abnormality determination unit 62a will erroneously determine abnormality. In order to avoid such erroneous detection, reference count value CNT_std needs to be "a natural number of at least 3".

Further, reference count value CNT_std may be set to have correlation with threshold value MCRT_std of motor current MCRT. More specifically, reference count value CNT_std is set to a relatively large value when threshold value MCRT_std is at a low current level, while it is set to a relatively small value with threshold value MCRT_std of a high current level.

With this configuration, when threshold value MCRT_std is low, it is determined to be abnormal when maximum motor current value MCRT_max exceeded threshold value MCRT_std by a greater number of times, so that erroneous detection can be avoided. Meanwhile, when threshold value MCRT_std is high, it is determined to be abnormal when maximum motor current value MCRT_max exceeded threshold value MCRT_std by a smaller number of times. This can reduce the load imposed on inverter 12 by the flow of overcurrent.

Furthermore, reference count value CNT_std may be set to have correlation with a temperature of circuit element of the drive circuit, instead of threshold value MCRT_std. To this end, a temperature sensor is provided to the circuit element to detect the temperature of the circuit element, and reference count value CNT_std is set to a relatively small value when the detected temperature is relatively high, while reference count value CNT_std is set to a relatively large value when the detected temperature is relatively low.

Referring again to FIG. 4, abnormality determination unit 62a, when determining that motor current MCRT is abnormal, generates a detection signal DET indicating that abnormality has been detected, and outputs the generated detection signal DET to relay drive unit 64 as well as to notification unit 66.

Relay drive unit 64, in response to detection signal DET, generates a signal SE for turning off system relays SR1, SR2, and outputs the signal to system relays SR1, SR2. When system relays SR1, SR2 are turned off in response to signal SE, DC power supply B is disconnected from power supply apparatus 100, so that it is possible to prevent the abnormal current from flowing into inverter 12.

Notification unit 66, in response to detection signal DET, generates a signal AL that is an alarm output to inform the user of occurrence of abnormality, and outputs the generated signal AL to the outside of power supply apparatus 100. Signal AL output is transferred to display means (not shown) incorporated in the vehicle, and converted to an audio signal or a video signal for output.

Figure 6:
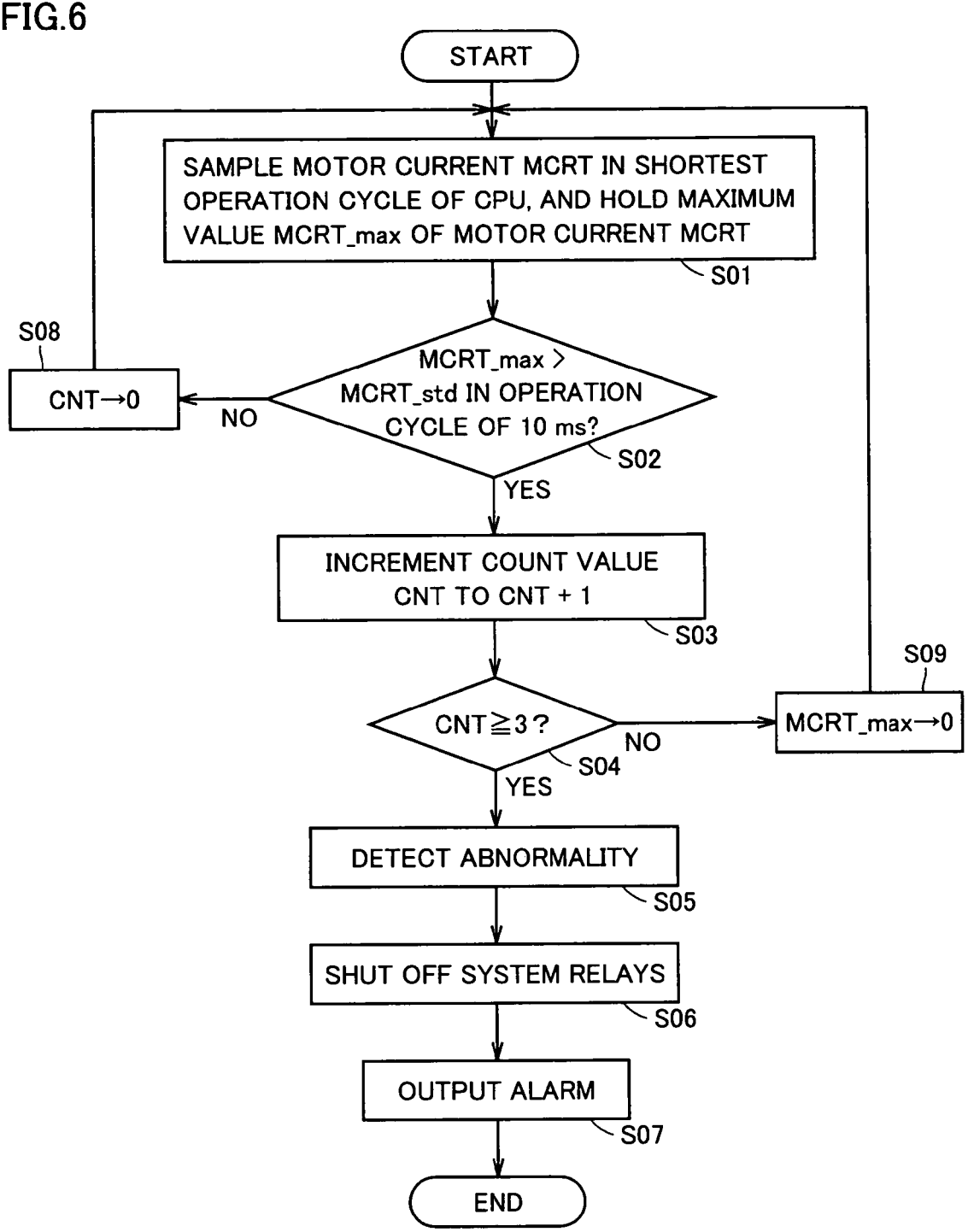
FIG. 6 is a flowchart illustrating an abnormal current detecting operation of the power supply apparatus according to the first embodiment of the present invention.

FIG. 6 is a flowchart illustrating an abnormal current detecting operation of the power supply apparatus according to the first embodiment of the present invention.

Referring to FIG. 6, firstly, current detection unit 60a starts sampling of motor current MCRT at the timing when motor current MCRT has exceeded threshold value MCRT_std. The sampling cycle is set to the shortest operation cycle of the CPU as the first operation cycle. Further, current detection unit 60a extracts and holds maximum motor current value MCRT_max from among the sampled current values, for each second operation cycle (=10 ms) (step S01). Maximum motor current value MCRT_max thus held is output to abnormality determination unit 62a.

Next, abnormality determination unit 62a determines whether maximum motor current value MCRT_max is greater than threshold value MCRT_std in the second operation cycle (step S02).

If it is determined in step S02 that maximum motor current value MCRT_max is greater than threshold value MCRT_std, abnormality determination unit 62a increments count value CNT to (CNT+1) (step S03).

If it is determined in step S02 that maximum motor current value MCRT_max is smaller than threshold value MCRT_std, abnormality determination unit 62a resets count value CNT (step S08).

Abnormality determination unit 62a carries out the determination and counting operations in steps S02, S03 and S08 on maximum motor current value MCRT_max provided for each second operation cycle. Further, every time count value CNT is incremented in step S03, abnormality determination unit 62a determines whether count value CNT has reached reference count value CNT_std (of at least 3) (step S04).

If it is determined that count value CNT has reached reference count value CNT_std, abnormality determination unit 62a generates detection signal DET indicating detection of abnormality in motor current MCRT, and outputs the generated detection signal DET to relay drive unit 64 and to notification unit 66 (step S05).

Relay drive unit 64, in receipt of detection signal DET, generates signal SE for turning off system relays SR1, SR2, and outputs the generated signal SE to system relays SR1, SR2. As such, system relays SR1, SR2 are shut off (step S06).

Notification unit 66, in receipt of detection signal DET, generates and outputs signal AL to display means (not shown) arranged outside the power supply apparatus 100. As such, occurrence of abnormal current is notified to the user (step S07).

If it is determined in step S04 that count value CNT has not reached reference count value CNT_std, that is, if maximum motor current value MCRT_max did not exceed threshold value MCRT_std in three consecutive second operation cycles, then maximum motor current value MCRT_max is reset (MCRT_max=0), as shown in step S09. The process then returns to step S01 to detect motor current MCRT again.

As described above, according to the first embodiment of the present invention, the motor current is detected for each second operation cycle, and presence/absence of abnormality in the motor current is determined based on the detected results of the motor current in at least three consecutive second operation cycles. Accordingly, it is possible to detect abnormality with high accuracy and thus to reliably protect the inverter.

Further, since the threshold value for determination of abnormality in the motor current is correlated with the count value, it is possible to reduce the load imposed on the inverter at the time of occurrence of abnormality, while maintaining the accuracy in abnormality detection.

Still further, while the motor current is sampled in the shortest operation cycle of the CPU, abnormality determination is carried out in an operation cycle longer than the shortest operation cycle. Thus, it is possible to effectively use the processing time of the CPU, and accordingly, a highly accurate abnormality determination system can be established with an inexpensive CPU.

Second Embodiment

Figure 7:
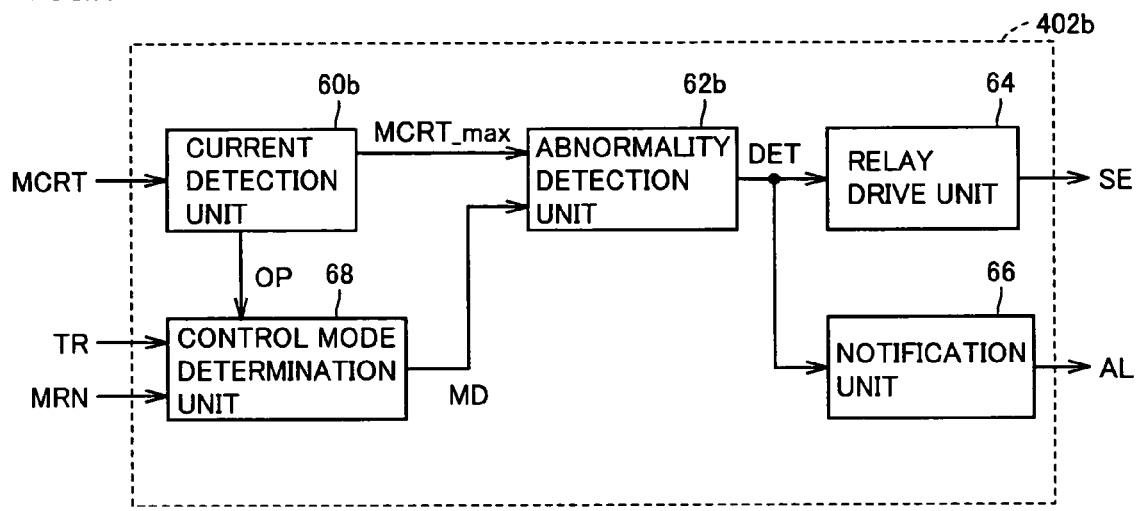
FIG. 7 is a block diagram of an abnormal current detection circuit in a power supply apparatus according to a second embodiment of the present invention.

FIG. 7 is a block diagram of an abnormal current detection circuit in a power supply apparatus according to a second embodiment of the present invention. The power supply apparatus of the present embodiment is identical to power supply apparatus 100 of FIG. 1 except that abnormal current detection circuit 402a is replaced with an abnormal current detection circuit 402b, and thus, detailed description of the common portions will not be repeated.

Referring to FIG. 7, abnormal current detection circuit 402b includes a current detection unit 60b, an abnormality determination unit 62b, a relay drive unit 64, a notification unit 66, and a control mode determination unit 68.

Current detection unit 60b, as in the first embodiment, starts sampling of motor current MCRT in the first operation cycle corresponding to the shortest operation cycle of the CPU when motor current MCRT exceeds threshold value MCRT_std. Current detection unit 60b captures and holds maximum motor current value MCRT_max from among the sampled motor currents MCRT, for each second operation cycle that is longer than the first operation cycle.

In parallel, current detection unit 60b generates a signal OP for driving control mode determination unit 68 at the timing when motor current MCRT has exceeded threshold value MCRT_std, and outputs the generated signal OP to control mode determination unit 68.

In receipt of signal OP from current detection unit 60b, control mode determination unit 68 determines a control mode of AC motor M1 based on torque command value TR and motor rotation number MRN supplied from an external ECU.

Here, the control modes of AC motor M1 in inverter 12 include a PWM (Pulse Width Modulation) control mode, an overmodulation control mode, and a rectangular wave control mode. These control modes differ in frequency (hereinafter, called "carrier frequency") for turning on/off NPN transistors Q1-Q6 included in inverter 12. More specifically, the PWM control mode has the highest carrier frequency, the overmodulation control mode has the next highest carrier frequency, and the rectangular wave control mode has the lowest carrier frequency.

As such, if the control mode of AC motor M1 in inverter 12 differs, the current waveform of motor current MCRT differs accordingly. This means that the degree of the load imposed on inverter 12 when there occurs abnormality in motor current MCRT differs dependent on the control mode. For example, the load imposed on inverter 12 is highest in the PWM control mode having the highest carrier frequency, while it is smallest in the rectangular wave control mode having the lowest carrier frequency.

Thus, in the present embodiment, different criteria for determination of abnormal current are set for the control modes, taking account of the degree of the load imposed on inverter 12. In this manner, it is possible to carry out abnormality detection with high accuracy irrespective of the current waveform of the abnormal current, so that protection of inverter 12 is further ensured.

Figure 8:
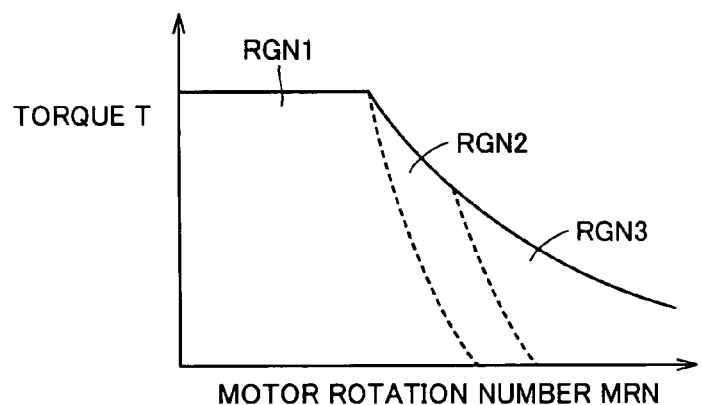
FIG. 8 shows the relation between torque T and motor rotation number MRN of an AC motor M1.

Hereinafter, a method for determining the control mode of AC motor M1 in control mode determination unit 68 will be described with reference to FIG. 8. FIG. 8 shows the relation between torque T and motor rotation number MRN of AC motor M1.

Torque T of AC motor M1 is constant up to a prescribed rotation number, and then gradually decreases with an increase of motor rotation number MRN. A region RGN1 indicates that the control mode of AC motor M1 is the PWM control mode, a region RGN2 indicates that it is the overmodulation control mode, and a region RGN3 indicates that it is the rectangular wave control mode.

When control mode determination unit 68 receives signal OP for driving control mode determination unit 68 from current detection unit 60b and receives torque command value TR and motor rotation number MRN from the external ECU, it determines to which one of regions RGN1-RGN3 the received torque command value TR and motor rotation number MRN belong. Control mode determination unit 68 then generates a signal MD indicating the determined control mode, and outputs the generated signal MD to abnormality determination unit 62b.

Here, control mode determination unit 68 holds a map indicating the relation between torque T and motor rotation number MRN of the motor shown in FIG. 8, and in receipt of torque command value TR and motor rotation number MRN from the external ECU, searches the map to determine to which one of regions RGN1-RGN3 shown in FIG. 8 the received torque command value TR and motor rotation number MRN belong, so as to determine in which control mode the AC motor M1 is, the PWM control mode, the overmodulation control mode or the rectangular wave control mode.

When abnormality determination unit 62b receives maximum motor current value MCRT_max from current detection unit 60b and receives signal MD from control mode determination unit 68, it adjusts threshold value MCRT_std based on the control mode designated by signal MD.

More specifically, abnormality determination unit 62b holds a map indicating correlation between the control mode and threshold value MCRT_std, and in receipt of signal MD from control mode determination unit 68, selects threshold value MCRT_std corresponding to the control mode designated by signal MD, and newly determines threshold value MCRT_std in the relevant control mode.

Threshold value MCRT_std is set to a different current value for a different control mode, based on the protection level of inverter 12 and the carrier frequency of the control mode. Specifically, threshold value MCRT_std is set lowest in the PWM control mode having the highest carrier frequency, it is set second lowest in the overmodulation control mode having the next highest carrier frequency, and it is set highest in the rectangular wave control mode having the lowest carrier frequency.

After adjusting threshold value MCRT_std of motor current MCRT, abnormality determination unit 62b determines whether maximum motor current value MCRT_max exceeds the thus adjusted threshold value MCRT_std, and determines presence/absence of abnormality of motor current MCRT based on the result of determination.

More specifically, it is determined whether maximum motor current value MCRT_max is greater than threshold value MCRT_std at every second operation cycle, as in the first embodiment. If it is determined that maximum motor current value MCRT_max is greater than threshold value MCRT_std, abnormality determination unit 62b increments count value CNT. If it is determined that maximum motor current value MCRT_max is smaller than threshold value MCRT_std, abnormality determination unit 62b resets count value CNT. As a result of the above determination, when count value CNT has reached reference count value CNT_std, abnormality determination unit 62b determines that there is abnormality in motor current MCRT, and outputs detection signal DET.

Relay drive unit 64 and notification unit 66 are identical to those described in the first embodiment.

Figure 9:
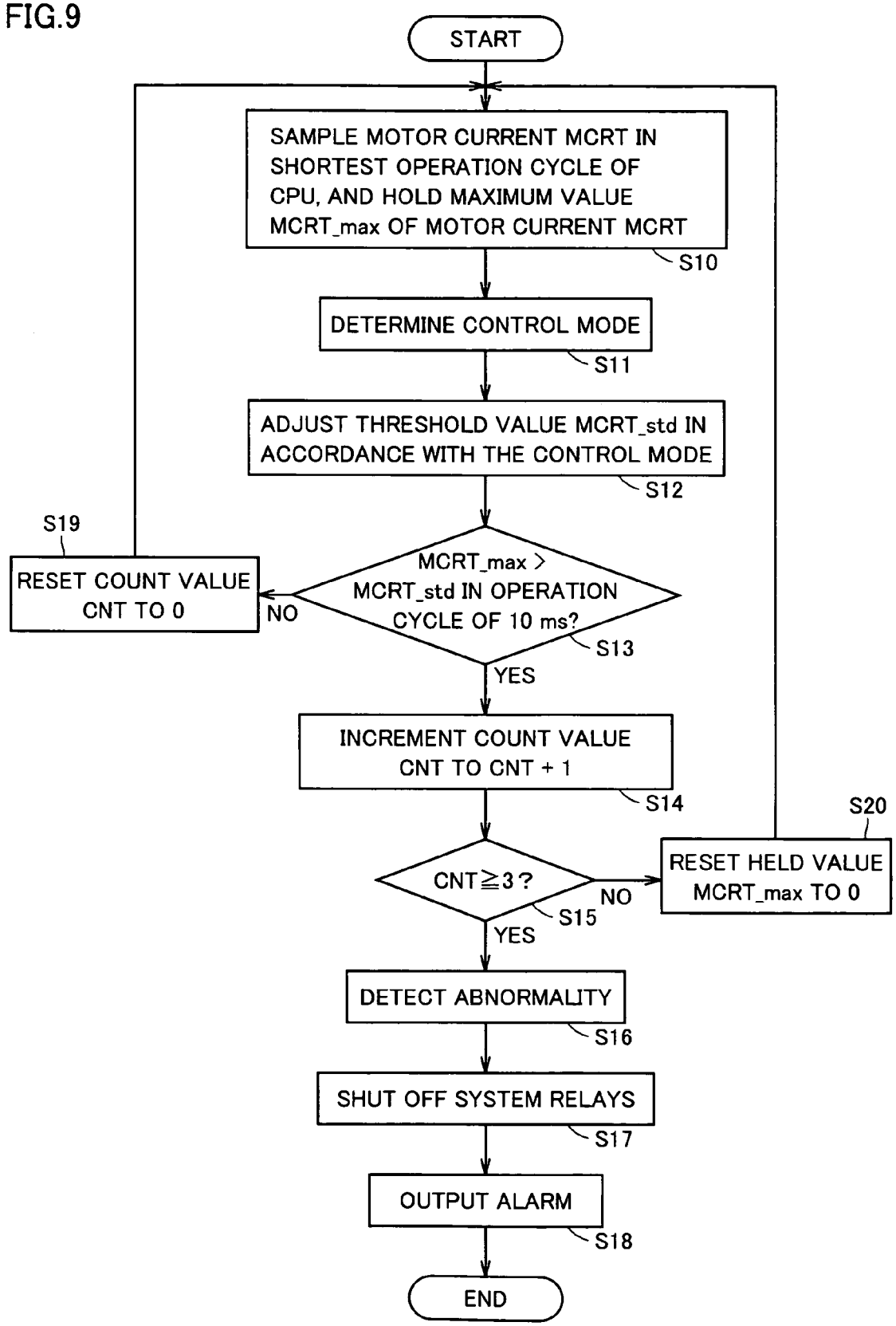
FIG. 9 is a flowchart illustrating an abnormal current detecting operation of the power supply apparatus according to the second embodiment of the present invention.

FIG. 9 is a flowchart illustrating an abnormal current detecting operation of the power supply apparatus according to the second embodiment of the present invention.

Referring to FIG. 9, firstly, current detection unit 60b starts sampling of motor current MCRT at the timing when motor current MCRT has exceeded threshold value MCRT_std. The sampling cycle is set to the shortest operation cycle of the CPU as the first operation cycle. Further, current detection unit 60b extracts and holds maximum motor current value MCRT_max from among the sampled current values for each second operation cycle (of 10 ms) (step S10). Maximum motor current value MCRT_max thus held is output to abnormality determination unit 62b.

Current detection unit 60b also generates signal OP indicating that motor current MCRT has exceeded threshold value MCRT_std in step S10, and outputs the generated signal OP to control mode determination unit 68. Control mode determination unit 68, in receipt of signal OP, determines whether the control mode is the PWM control mode, the overmodulation control mode or the rectangular wave control mode, based on torque command value TR and motor rotation number MRN received from the external ECU. Control mode determination unit 68 generates signal MD indicating the determined control mode, and outputs the generated signal MD to abnormality determination unit 62b (step S11).

Abnormality determination unit 62b, in receipt of maximum motor current value MCRT_max from current detection unit 60b and signal MD from control mode determination unit 68, adjusts threshold value MCRT_std to be the one corresponding to the control mode designated by signal MD (step S12).

Next, abnormality determination unit 62b determines whether maximum motor current value MCRT_max is greater than the thus adjusted threshold value MCRT_std in the second operation cycle (step S13).

If it is determined in step S13 that maximum motor current value MCRT_max is greater than threshold value MCRT_std, abnormality determination unit 62b increments count value CNT to (CNT+1) (step S14).

Meanwhile, if it is determined in step S13 that maximum motor current value MCRT_max is smaller than threshold value MCRT_std, then abnormality determination unit 62b resets count value CNT (step S19).

Abnormality determination unit 62b carries out the determination and counting operations in steps S13, S14 and S19 on maximum motor current value MCRT_max provided for each second operation cycle. Further, every time count value CNT is incremented in step S14, abnormality determination unit 62b determines whether count value CNT has reached reference count value CNT_std (of at least 3) (step S15).

When it is determined that count value CNT has reached reference count value CNT_std (of at least 3), abnormality determination unit 62b generates detection signal DET indicating that abnormality in motor current MCRT has been detected, and outputs the generated detection signal DET to relay drive unit 64 and notification unit 66 (step S16).

Relay drive unit 64, in receipt of detection signal DET, generates signal SE for turning off system relays SR1, SR2, and outputs the generated signal SE to system relays SR1, SR2. As such, system relays, SR1, SR2 are shut off (step S17).

Notification unit 66, in receipt of detection signal DET, generates and outputs signal AL to display means arranged outside of power supply apparatus 100, so as to notify the user of occurrence of an abnormal current (step S18).

If it is determined in step S15 that count value CNT has not reached reference count value CNT_std, that is, if maximum motor current value MCRT_max did not exceed threshold value MCRT_std in three consecutive second operation cycles, current detection unit 60b resets maximum motor current value MCRT_max (MCRT_max=0) as shown in step S20, and then returns to step S10 to detect motor current MCRT. The subsequent process is the same as in the first embodiment.

As described above, according to the second embodiment of the present invention, the threshold value of the motor current is adjusted based on the control mode of the AC motor. This enables highly accurate determination of abnormality irrespective of the waveform of the abnormal current, thereby ensuring protection of the inverter.

Third Embodiment

Figure 10:
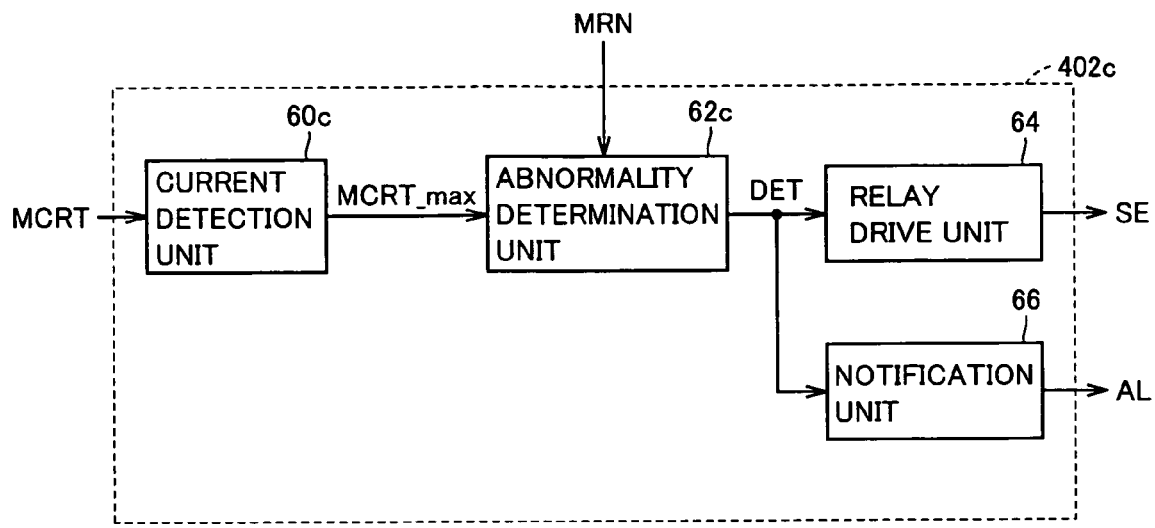
FIG. 10 is a block diagram of an abnormal current detection circuit in a power supply apparatus according to a third embodiment of the present invention.

FIG. 10 is a block diagram of an abnormal current detection circuit in a power supply apparatus according to a third embodiment of the present invention. The power supply apparatus of the present embodiment is identical to power supply apparatus 100 shown in FIG. 1 except that abnormal current detection circuit 402a is replaced with an abnormal current detection circuit 402c, and thus, detailed description of the common portions will not be repeated.

Referring to FIG. 10, abnormal current detection circuit 402c includes a current detection unit 60c, an abnormality determination unit 62c, a relay drive unit 64, and a notification unit 66.

Current detection unit 60c, similarly to current detection unit 60a of the first embodiment, starts sampling of motor current MCRT in the first operation cycle corresponding to the shortest operation cycle of the CPU when motor current MCRT exceeds threshold value MCRT_std. Further, current detection unit 60c captures and holds maximum motor current value MCRT_max from among the sampled motor currents MCRT, for each second operation cycle longer than the first operation cycle. Maximum motor current value MCRT_max thus held for each second operation cycle is output to abnormality determination unit 62c.

Abnormality determination unit 62c receives maximum motor current value MCRT_max from current detection unit 60c, and also receives motor rotation number MRN from rotation speed calculation unit 54 of inverter control means 401 shown in FIG. 3. Abnormality determination unit 62c then determines presence/absence of abnormality in motor current MCRT based on the relation in magnitude between maximum motor current value MCRT_max and threshold value MCRT_std as well as motor rotation number MRN in a manner as described below. That is, abnormal current detection circuit 402c of the present embodiment differs from the above-described abnormal current detection circuit 402a in that motor rotation number MRN is used as one of the parameters for determination of abnormality in abnormality determination unit 62c.

Figure 11:
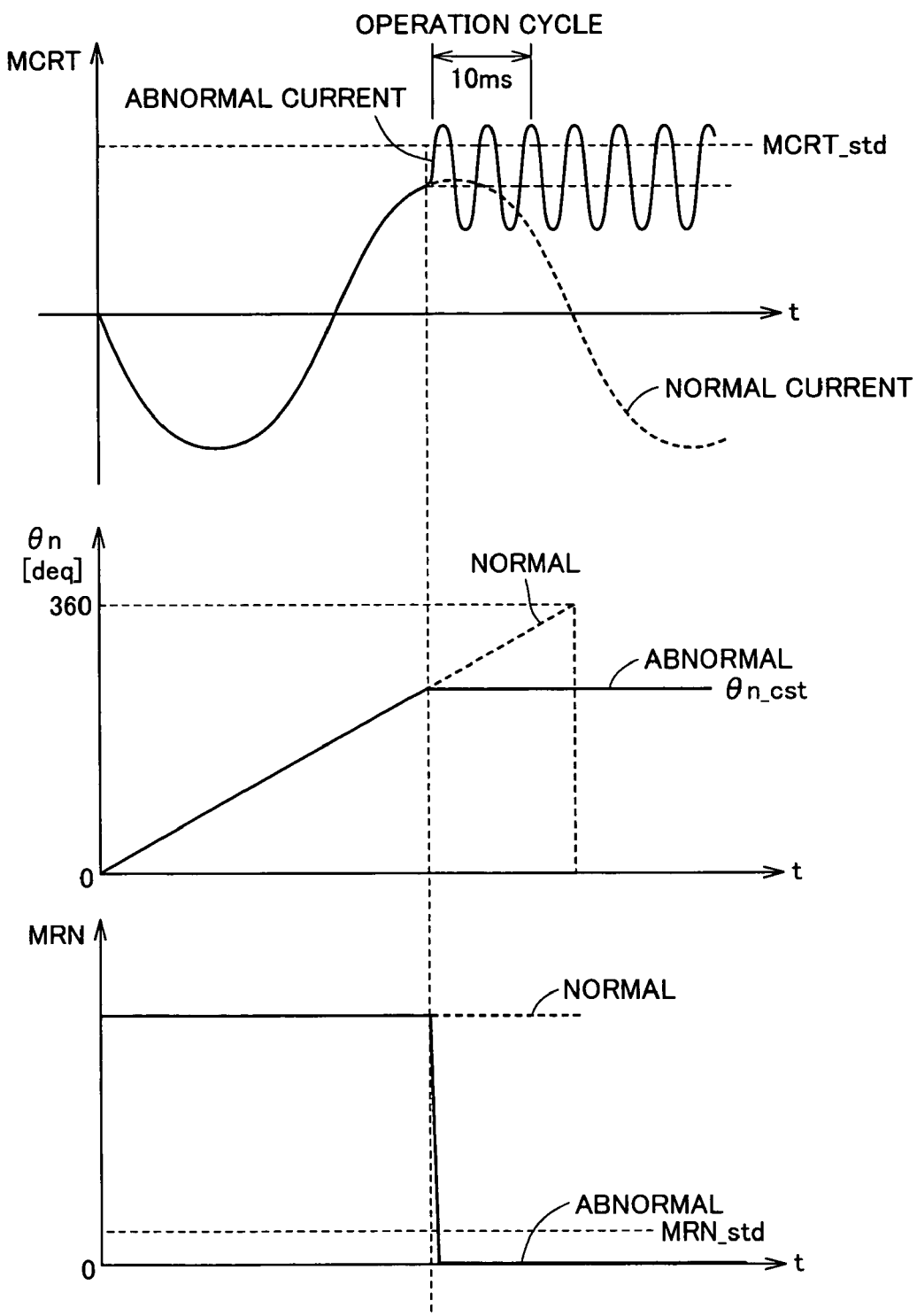
FIG. 11 is a schematic diagram illustrating an abnormality detecting operation in the abnormal current detection circuit shown in FIG. 10.

FIG. 11 schematically illustrates an abnormality detecting operation by abnormal current detection circuit 402c shown in FIG. 10.

Referring to FIG. 11, motor current MCRT has a current waveform of sine wave, as shown by a dotted line, when power supply apparatus 100 is in a normal state. Rotation angle θn detected by resolver 30 shows an output waveform that monotonously increases from 0 [deg] to 360 [deg]. Then, motor rotation number MRN, obtained by time differentiation of this rotation angle θn, shows a waveform maintaining an approximately constant value.

Here, if abnormality such as breaking of resolver 30 occurs in power supply apparatus 100, resolver 30 cannot detect an accurate rotation position, and continues to output rotation angle θn fixed to a prescribed angle θn_cst as shown by a solid line. Inverter control circuit 401, in receipt of this rotation angle θn_cst, generates a drive signal DRV for turning on/off NPN transistors Q1-Q6 in inverter 12 in the above-described manner, based on the rotation angle θn_cst, torque command value TR and motor current MCRT. At this time, although motor current MCRT flowing through the respective phases of AC motor M1 is supposed to be controlled to maintain a prescribed current value in response to the fixed rotation angle θn_cst, in reality, it ultimately attains a current waveform that oscillates about a prescribed current value as a result of divergence of gain of feedback control in inverter control circuit 401. If motor current MCRT continues to oscillate at a current level higher than a normal current, inverter 12 may be broken due to the overcurrent continuously flowing therethrough.

Thus, in the present embodiment, in order to detect the overcurrent in a short time period and with high accuracy, abnormal current detection circuit 402c is configured to determine presence of abnormality in power supply apparatus 100 by detecting that motor current MCRT exceeding threshold value MCRT_std continuously flows and that motor rotation number MRN is continuously smaller than a prescribed rotation number.

The present configuration is based on the fact, as seen from FIG. 11, that when there is abnormality in resolver 30, motor current MCRT oscillates in response to fixed rotation angle θn_cst, and motor rotation number MRN obtained by time differentiation of rotation angle θn_cst is fixed to approximately zero.

With abnormal current detection circuit 402c of this configuration, it is possible to detect abnormality of power supply apparatus 100 with higher accuracy than in the case of abnormal current detection circuit 402a of the first embodiment.

Specifically, as described in the first embodiment, abnormal current detection circuit 402a determines presence/absence of abnormality in motor current MCRT based on the relation in magnitude between maximum motor current value MCRT-max and threshold value MCRT_std. At this time, abnormality determination unit 62a determines that there is abnormality in motor current MCRT when detecting that maximum motor current value MCRT_max has exceeded threshold value MCRT_std in at least three consecutive second operation cycles.

With this abnormality determination method, however, there may be a case where motor current MCRT is determined abnormal when noise exceeding threshold value MCRT_std is instantaneously superposed on motor current MCRT in each of the at least three consecutive second operation cycles. This is because of the configuration where maximum motor current value MCRT_max is compared in magnitude with threshold value MCRT_std at every second operation cycle for the purpose of restricting the load required for abnormality determination, making it difficult to determine whether motor current MCRT is continuously or instantaneously exceeding threshold value MCRT_std.

In contrast, abnormal current detection circuit 402c of the present embodiment additionally uses motor rotation number MRN as the parameter for determination of abnormality, and determines presence of abnormality in motor current MCRT when detecting that maximum motor current value MCRT_max has exceeded threshold value MCRT_std in at least three consecutive second operation cycles and that motor rotation number MRN has been fixed to an approximately zero level. In this manner, it is possible to clearly distinguish the case where motor current MCRT instantaneously exceeds threshold value MCRT_std due to superposition of noise from the case where motor current MCRT continuously exceeds threshold value MCRT_std, since rotation angle θn is not fixed and thus motor rotation umber MRN does not become approximately zero. Therefore, according to abnormal current detection circuit 402c, only the motor current MCRT continuously exceeding threshold value MCRT_std is determined as an abnormal current. This further improves accuracy in abnormality determination and prevents erroneous detection.

Referring again to FIG. 10, when determining that motor current MCRT is abnormal, abnormality determination unit 62c generates detection signal DET indicating detection of abnormality and outputs the generated detection signal DET to relay drive unit 64 and notification unit 66.

Relay drive unit 64, in response to detection signal DET, generates signal SE for turning off system relays SR1, SR2, and outputs the generated signal SE to system relays SR1, SR2. As system relays SR1, SR2 are turned off in response to signal SE, DC power supply B is disconnected from power supply apparatus 100, and flow-in of the abnormal current into inverter 12 is prevented.

Notification unit 66, in response to detection signal DET, generates signal AL that is an alarm output for notifying the user of occurrence of abnormality, and outputs the generated signal AL to the outside of power supply apparatus 100. When the output signal AL is transferred to display means (not shown) mounted to a vehicle, it is converted to an audio or video signal for output.

Figure 12:
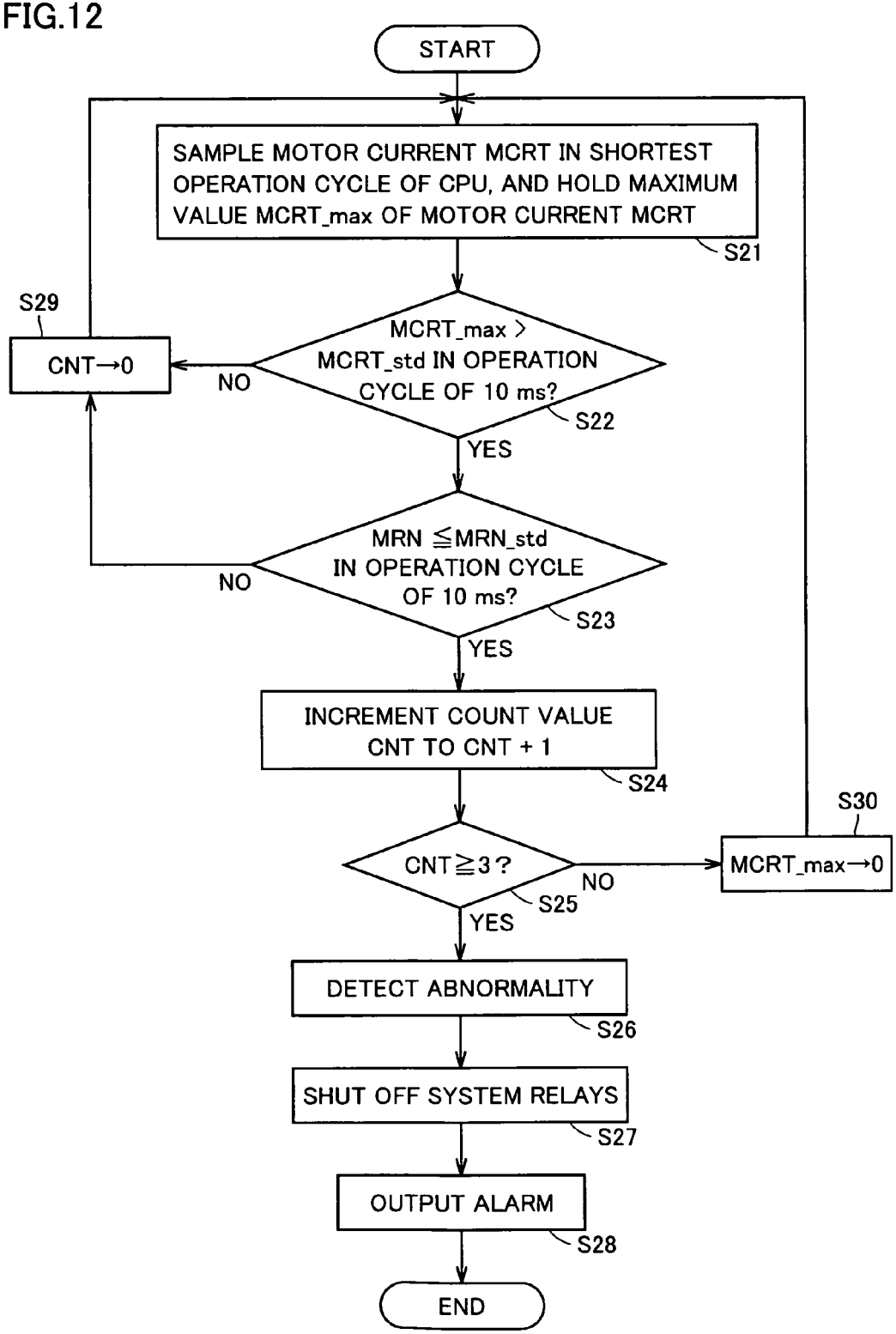
FIG. 12 is a flowchart illustrating an abnormal current detecting operation in the power supply apparatus according to the third embodiment of the present invention.
Figure 13:
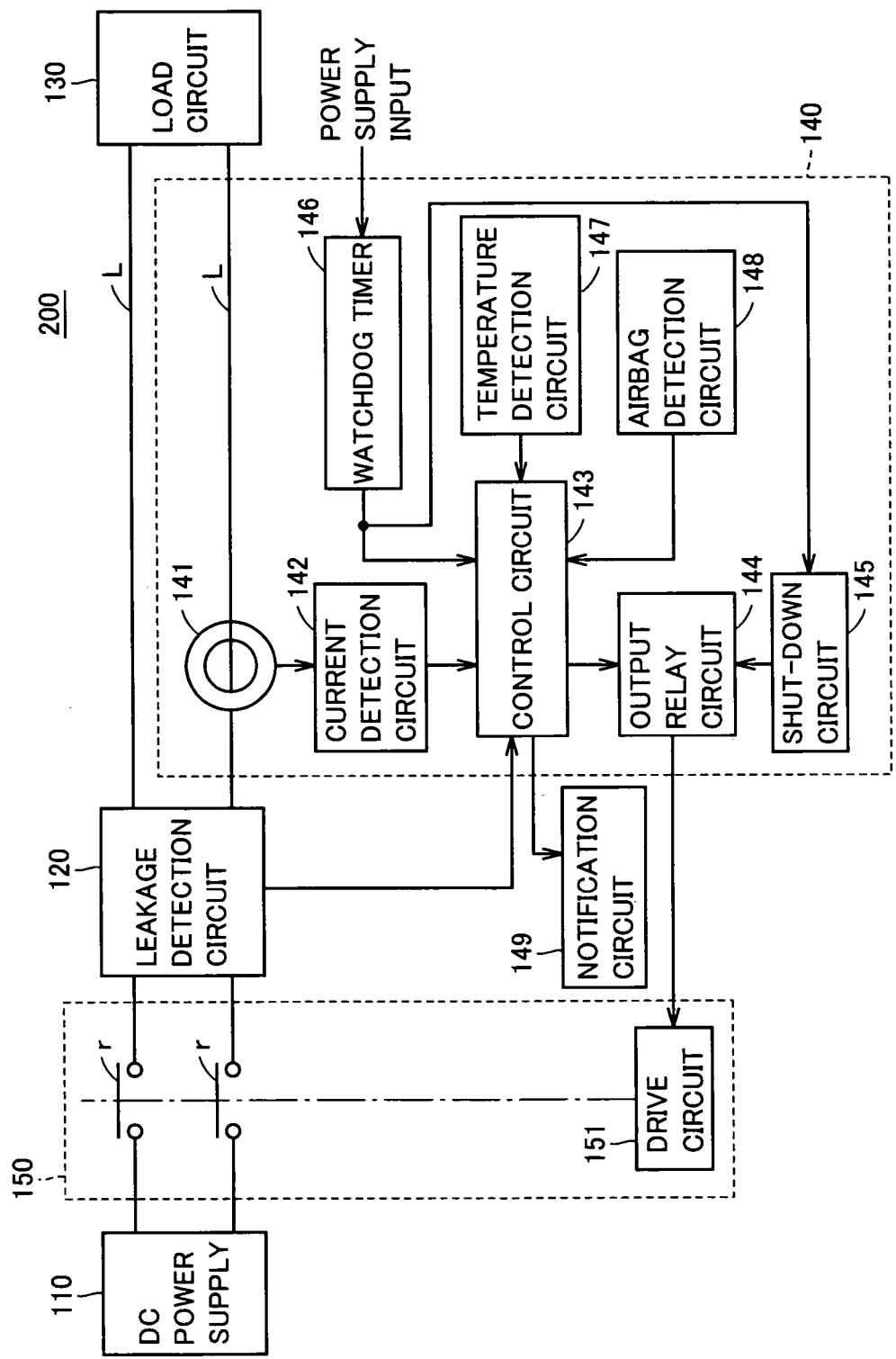
FIG. 13 is a block diagram showing a configuration of a safety device for an electric vehicle described in Japanese Patent Laying-Open No. 07-123504.

FIG. 12 is a flowchart illustrating an abnormal current detecting operation of the power supply apparatus according to the third embodiment of the present invention.

Referring to FIG. 12, firstly, current detection unit 60a starts sampling of motor current MCRT at the timing when motor current MCRT has exceeded threshold value MCRT_std. The sampling cycle is set to the shortest operation cycle of the CPU as the first operation cycle. Further, current detection unit 60a extracts and holds maximum motor current value MCRT_max from among the sampled current values for each second operation cycle (=10 ms) (step S21).

The thus held maximum motor current value MCRT_max is output to abnormality determination unit 62c.

Next, abnormality determination unit 62c determines whether maximum motor current value MCRT_max is greater than threshold value MCRT_std in the second operation cycle (step S22).

If it is determined in step S22 that maximum motor current value MCRT_max is greater than threshold value MCRT_std, abnormality determination unit 62c further determines whether motor rotation number MRN is not greater than a prescribed rotation number MRN_std (step S23). It is noted that prescribed rotation number MRN_std is set near 0 and considerably lower than the rotation number that is detected when resolver 30 is normal, taking variation into consideration.

If it is determined in step S23 that motor rotation number MRN is not greater than prescribed rotation number MRN_std, abnormality determination unit 62c increments count CNT to (CNT+1) (step S24).

If it is determined in step S22 that maximum motor current value MCRT_max is smaller than threshold value MCRT_std, abnormality determination unit 62c resets count value CNT (step S29). If it is determined in step S23 that motor rotation number MRN is greater than prescribed rotation number MRN_std, abnormality determination unit 62c also resets count value CNT.

Abnormality determination unit 62c carries out the determination and counting operations in steps S22-S24 and S29 on maximum motor current value MCRT_max provided for each second operation cycle. Further, abnormality determination unit 62c determines, every time count value CNT is incremented in step S24, whether count value CNT has reached reference count value CNT_std (of at least 3) (step S25).

If it is determined that count value NCT has reached reference count value CNT_std, abnormality determination unit 62c generates detection signal DET indicating detection of abnormality in motor current MCRT, and outputs the generated detection signal DET to relay drive unit 64 and notification unit 66 (step S26).

Relay drive unit 64, in receipt of detection signal DET, generates and outputs signal SE for turning off system relays SR1, SR2, and in response, system relays SR1, SR2 are shut off (step S27).

Notification unit 66, in receipt of detection signal DET, generates and outputs signal AL to display means (not shown) arranged outside power supply apparatus 100, to thereby notify the user of occurrence of an abnormal current (step S28).

Meanwhile, if it is determined in step S25 that count value CNT has not reached reference count value CNT_std, that is, if maximum motor current value MCRT_max did not exceed threshold value MCRT_std in three consecutive second operation cycles, maximum motor current value MCRT_max is reset (MCRT_max=0) as shown in step S30. The process then returns to step S21 to detect motor current MCRT again.

As described above, according to the third embodiment of the present invention, the motor current and the motor rotation number are detected at every second operation cycle, and abnormality in motor current is determined based on the results of detection of the motor current and the motor rotation number in at least three consecutive second operation cycles. As such, it is possible to detect the abnormality with higher accuracy, to further improve protection of the inverter.

In the present embodiment as well, the threshold value for determination of abnormality in the motor current may be correlated with the reference counter value, as in the first embodiment, to keep high accuracy in abnormality detection, and also to reduce the load imposed on the inverter upon occurrence of abnormality.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply apparatus, comprising:
a CPU having prescribed operation cycles including a shortest operation cycle;
a power supply;
a drive circuit for receiving supply of power from said power supply and driving a load circuit; and
an abnormal current detection circuit for detecting abnormality in a drive current flowing through said drive circuit;
said abnormal current detection circuit including
current detection means for detecting a maximum value of said drive current for each prescribed operation cycle, and
abnormality determination means for determining whether the maximum value of said drive current exceeds a prescribed threshold value for each said prescribed operation cycle, and determining presence of abnormality in said drive current when detecting that the maximum value of said drive current exceeds said prescribed threshold value in each of n (n is a natural number of at least 3) consecutive cycles of said prescribed operation cycles including a first operation cycle, wherein the first operation cycle is set to the shortest operation cycle of the CPU.

2. A power supply apparatus, comprising:
a CPU having prescribed operation cycles including a shortest operation cycle;
a power supply;
a drive circuit for receiving supply of power from said power supply and driving a load circuit; and
an abnormal current detection circuit for detecting abnormality in a drive current flowing through said drive circuit;
said abnormal current detection circuit including
current detection means for starting sampling of said drive current using a prescribed threshold value as a trigger and detecting a maximum value of said drive current for each prescribed operation cycle, and
abnormality determination means for determining whether the maximum value of said drive current exceeds said prescribed threshold value for each said prescribed operation cycle, and determining presence of abnormality in said drive current when detecting that the maximum value of said drive current exceeds said prescribed threshold value in each of n (n is a natural number of at least 3) consecutive cycles of said prescribed operation cycles including a first operation cycle, wherein the first operation cycle is set to the shortest operation cycle of the CPU.

3. The power supply apparatus according to claim 1, wherein
said load circuit includes an AC motor,
said abnormal current detection circuit further includes mode determination means for determining a control mode of said AC motor, and
said abnormality determination means adjusts said prescribed threshold value to a threshold value suitable for the determined control mode, determines whether the detected maximum value of said drive current exceeds said suitable threshold value for each said prescribed operation cycle, and determines presence of abnormality in said drive current when detecting that the maximum value of said drive current exceeds said suitable threshold value in each of said n consecutive prescribed operation cycles.

4. The power supply apparatus according to claim 3, wherein said mode determination means determines one of control modes having different carrier frequencies.

5. The power supply apparatus according to claim 4, wherein said abnormality determination means adjusts said threshold value in accordance with the carrier frequency of said determined control mode.

6. The power supply apparatus according to claim 1, further comprising rotation number detection means for detecting a motor rotation number of said AC motor based on a rotation angle of said AC motor, wherein
said abnormality determination means determines whether the maximum value of said drive current exceeds the prescribed threshold value for each said prescribed operation cycle and whether said motor rotation number is not greater than a prescribed rotation number, and determines presence of abnormality in said drive current when detecting that the maximum value of said drive current exceeds said prescribed threshold value in each of said n consecutive prescribed operation cycles and that said motor rotation number is not greater than said prescribed rotation number.

7. The power supply apparatus according to claim 6, wherein said prescribed rotation number is set smaller than a motor rotation number detected by said rotation number detection means during a normal operation of said power supply apparatus.

8. The power supply apparatus according to claim 1, further comprising a switch for electrically connecting/disconnecting said power supply to/from said drive circuit by an opening/closing operation, wherein
said abnormal current detection circuit controls the opening/closing operation in such a manner that said power supply is electrically disconnected from said drive circuit upon detection of abnormality in said drive current.

9. The power supply apparatus according to claim 8, wherein said prescribed threshold value is set to a current level higher than said drive current flowing in said drive circuit when said power supply apparatus is in a normal operation.

10. The power supply apparatus according to claim 9, wherein a period corresponding to a total sum of said n consecutive prescribed operation cycles is set shorter than a time period causing breaking of said drive circuit when the drive current of a current level corresponding to said prescribed threshold value continuously flows in said drive circuit during the time period.

11. The power supply apparatus according to claim 10, wherein said n is set to 3.

12. The power supply apparatus according to claim 1, wherein
said abnormality determination means includes counting means,
said counting means increments a count value when it is determined that the maximum value of said drive current exceeds said prescribed threshold value and resets said count value when it is determined that the maximum value of said drive current does not exceed said prescribed threshold value in each said prescribed operation cycle, and
said abnormality determination means determines presence of abnormality in said drive current when detecting that said count value has reached a count value equal to said n.

13. The power supply apparatus according to claim 12, wherein said abnormality determination means adjusts said n in accordance with said prescribed threshold value.

14. The power supply apparatus according to claim 13, wherein said abnormality determination means adjusts said n to a smaller value as said prescribed threshold value becomes higher.

15. The power supply apparatus according to claim 12, wherein
said abnormal current detection circuit further includes temperature detection means for detecting a temperature of a circuit element of said drive circuit, and
said abnormality determination means adjusts said n in accordance with said detected temperature of the circuit element.

16. The power supply apparatus according to claim 15, wherein said abnormality determination means adjusts said n to a smaller value as said detected temperature of the circuit element becomes higher.

17. The power supply apparatus according to claim 1, wherein said prescribed operation cycle is longer than a shortest operation cycle of said abnormal current detection circuit.

18. The power supply apparatus according to claim 17, wherein said current detection means samples a drive current in said shortest operation cycle, and extracts and holds a maximum value of said drive current from among said sampled drive currents for each said prescribed operation cycle.

19. A power supply apparatus, comprising:
a CPU having prescribed operation cycles including a shortest operation cycle;
a power supply;
a drive circuit for receiving supply of power from said power supply and driving a load circuit; and
an abnormal current detection circuit for detecting abnormality in a drive current flowing through said drive circuit;
said abnormal current detection circuit including
a current detection unit for detecting a maximum value of said drive current for each prescribed operation cycle, and
an abnormality determination unit for determining whether the maximum value of said drive current exceeds a prescribed threshold value for each said prescribed operation cycle, and determining presence of abnormality in said drive current when detecting that the maximum value of said drive current exceeds said prescribed threshold value in each of n (n is a natural number of at least 3) consecutive cycles of said prescribed operation cycles including a first operation cycle, wherein the first operation cycle is set to the shortest operation cycle of the CPU.

20. A power supply apparatus, comprising:
a CPU having prescribed operation cycles including a shortest operation cycle;
a power supply;
a drive circuit for receiving supply of power from said power supply and driving a load circuit; and
an abnormal current detection circuit for detecting abnormality in a drive current flowing through said drive circuit;
said abnormal current detection circuit including
a current detection unit for starting sampling of said drive current using a prescribed threshold value as a trigger and detecting a maximum value of said drive current for each prescribed operation cycle, and
an abnormality determination unit for determining whether the maximum value of said drive current exceeds said prescribed threshold value for each said prescribed operation cycle, and determining presence of abnormality in said drive current when detecting that the maximum value of said drive current exceeds said prescribed threshold value in each of n (n is a natural number of at least 3) consecutive cycles of said prescribed operation cycles including a first operation cycle, wherein the first operation cycle is set to the shortest operation cycle of the CPU.

21. The power supply apparatus according to claim 19, wherein
said load circuit includes an AC motor,
said abnormal current detection circuit further includes a mode determination unit for determining a control mode of said AC motor, and
said abnormality determination unit adjusts said prescribed threshold value to a threshold value suitable for the determined control mode, determines whether the detected maximum value of said drive current exceeds said suitable threshold value for each said prescribed operation cycle, and determines presence of abnormality in said drive current when detecting that the maximum value of said drive current exceeds said suitable threshold value in each of said n consecutive prescribed operation cycles.

22. The power supply apparatus according to claim 21, wherein said mode determination unit determines one of control modes having different carrier frequencies.

23. The power supply apparatus according to claim 22, wherein said abnormality determination unit adjusts said threshold value in accordance with the carrier frequency of said determined control mode.

24. The power supply apparatus according to claim 19, further comprising rotation number detection means for detecting a motor rotation number of said AC motor based on a rotation angle of said AC motor, wherein
said abnormality determination unit determines whether the maximum value of said drive current exceeds the prescribed threshold value for each said prescribed operation cycle and whether said motor rotation number is not greater than a prescribed rotation number, and determines presence of abnormality in said drive current when detecting that the maximum value of said drive current exceeds said prescribed threshold value in each of said n consecutive prescribed operation cycles and that said motor rotation number is not greater than said prescribed rotation number.

25. The power supply apparatus according to claim 24, wherein said prescribed rotation number is set smaller than a motor rotation number detected by said rotation number detection means during a normal operation of said power supply apparatus.

26. The power supply apparatus according to claim 19, further comprising a switch for electrically connecting/disconnecting said power supply to/from said drive circuit by an opening/closing operation, wherein said abnormal current detection circuit controls the opening/closing operation in such a manner that said power supply is electrically disconnected from said drive circuit upon detection of abnormality in said drive current.

27. The power supply apparatus according to claim 26, wherein said prescribed threshold value is set to a current level higher than said drive current flowing in said drive circuit when said power supply apparatus is in a normal operation.

28. The power supply apparatus according to claim 27, wherein a period corresponding to a total sum of said n consecutive prescribed operation cycles is set shorter than a time period causing breaking of said drive circuit when the drive current of a current level corresponding to said prescribed threshold value continuously flows in said drive circuit during the time period.

29. The power supply apparatus according to claim 28, wherein said n is set to 3.

30. The power supply apparatus according to claim 19, wherein said abnormality determination unit includes counting unit, said counting unit increments a count value when it is determined that the maximum value of said drive current exceeds said prescribed threshold value and resets said count value when it is determined that the maximum value of said drive current does not exceed said prescribed threshold value in each said prescribed operation cycle, and said abnormality determination unit determines presence of abnormality in said drive current when detecting that said count value has reached a count value equal to said n.

31. The power supply apparatus according to claim 30, wherein said abnormality determination unit adjusts said n in accordance with said prescribed threshold value.

32. The power supply apparatus according to claim 31, wherein said abnormality determination unit adjusts said n to a smaller value as said prescribed threshold value becomes higher.

33. The power supply apparatus according to claim 30, wherein said abnormal current detection circuit further includes temperature detection means for detecting a temperature of a circuit element of said drive circuit, and said abnormality determination unit adjusts said n in accordance with said detected temperature of the circuit element.

34. The power supply apparatus according to claim 33, wherein said abnormality determination unit adjusts said n to a smaller value as said detected temperature of the circuit element becomes higher.

35. The power supply apparatus according to claim 19, wherein said prescribed operation cycle is longer than a shortest operation cycle of said abnormal current detection circuit.

36. The power supply apparatus according to claim 35, wherein said current detection unit samples a drive current in said shortest operation cycle, and extracts and holds a maximum value of said drive current from among said sampled drive currents for each said prescribed operation cycle.

37. The power supply apparatus according to claim 1, further comprising an inverter used to generate a drive current from an AC motor.

* * * * *